United States Patent [19]

O'Neil

[11] Patent Number: 5,727,842
[45] Date of Patent: Mar. 17, 1998

[54] DEVICE FOR ATTACHING BABY BOTTLES TO CAR SEATS

[76] Inventor: James G. O'Neil, 107 New Castle La., Willingboro, N.J. 08046

[21] Appl. No.: 720,043

[22] Filed: Sep. 27, 1996

[51] Int. Cl.[6] .................................................. A47D 15/00
[52] U.S. Cl. .................................... 297/188.06; 248/102
[58] Field of Search .......................... 297/188.01, 188.06, 297/188.2, 217.1, 250.1; 24/3.13, 3.4, 115 G; 248/102, 104; 224/148.6, 409, 572

[56] References Cited

U.S. PATENT DOCUMENTS

| | | | |
|---|---|---|---|
| 1,014,004 | 1/1912 | Irwin | 248/102 |
| 1,136,529 | 4/1915 | Hopwood | 248/102 |
| 2,815,909 | 12/1957 | Paprocki et al. | 248/102 |
| 2,841,349 | 7/1958 | Charles | 248/104 |
| 4,630,793 | 12/1986 | Hunter | 248/102 |
| 4,722,713 | 2/1988 | Williams et al. | 248/102 X |
| 5,459,903 | 10/1995 | Treacy | 248/102 X |

Primary Examiner—Peter R. Brown
Attorney, Agent, or Firm—Richard L. Huff

[57] ABSTRACT

Devices for holding baby bottles for infants in car seat with or without crash bars. One device, for a car seat which does not have a crash bar, contains two fasteners which may attach to each side of the car seat or to the seat of the automobile. Each fastener is attached to an adjustable cord, which in turn is attached to a sling. The sling is preferably filled with foamed plastic to create a soft surface for the infant. A holding cord is attached by its center to the center of the sling. The ends of the holding cord wrap around the baby bottle and may be snugly secured to hold the bottle. A second device is designed for car seats with crash bars. This device comprises a flexible arm containing a spine made up of a plurality of segments. The arm is attached to the crash bar. The distal end of the arm is attached to a bottle rest which contains straps for securing the bottle. Each of these devices permits the bottle to be kept within the easy reach of an infant.

4 Claims, 9 Drawing Sheets

DEVICE FOR ATTACHING BABY BOTTLES TO CAR SEATS

BACKGROUND OF THE INVENTION

1. Field of the Invention

This invention relates to devices for securing baby bottles to car seats.

2. Description of the Related Art

The prior art is aware of baby bottle holders which support bottles for infants while traveling in a car seat. Examples of such devices are found in U.S. Pat. Nos. 4,718,623 to McClure, 4,989,811 to Millis et al, and 5,489,075 to Ible. The ideal bottle holder will be light in weight, have no hard edges, will maintain the bottle in an upright position when not in use in order to avoid spillage, and will maintain the bottle in a position which is convenient for the infant in that it is within easy sight and reach. The device of U.S. Pat. No. 4,718,623 is designed to be slung over a cushioned side panel of a car seat, making it necessary for the infant to engage in contortions in order to use the bottle. Also, the bottle holder is designed to hold the bottle in a downward position, thus allowing leakage of the contents. The device of U.S. Pat. No. 4,989,811 is designed to be suspended from a door handle. This would make the bottle inconvenient to the infant, and would not ensure that the bottle would be accessible. The holding device of U.S. Pat. No. 5,489,075 presents hard surfaces to the infant, which could cause harm.

SUMMARY OF THE INVENTION

The present invention overcomes the disadvantages of the noted prior art by providing baby bottle holders which are to be attached to car seats, which bottle holders are simply and inexpensively made, present only soft surfaces to the infant, maintain the bottle in an upright position when not in use, and keep the bottle in a location which is convenient for the infant.

In one aspect of this invention, the bottle holder is designed for use with car seats which are not equipped with crash bars. The central part of this device is a long sling, preferably filled with foamed plastic. The sling is held in place by means of adjustable cords which are attached to the sling and to fasteners which clip onto the baby car seat or the seat of the automobile. A holding cord is attached to the sling. The holding cord is adapted to encircle the neck of the bottle and to be held snugly to the neck by the use of a cord lock. This enables the bottle to be held in a position which is convenient for the infant. Because the sling is lax, the bottle may be easily lifted by the infant. When released, the bottle will maintain an upright position and will remain in easy reach.

In a second aspect of this invention, the bottle holder is designed for use with car seats which have crash bars. A segmented spine, preferably covered with a foamed plastic and a removable cover forms an arm which is attached to the crash bar. A bottle rest is attached to the forward end of the arm. The bottle rest is equipped with two straps designed to encircle the bottle. When the bottle is not in use, it is maintained in the upright position and is readily accessible to the infant. Because of the segmentation of the spine, the arm is flexible, making the bottle easy to lift. The use of a removable cover makes cleaning easy, and use of hook-and-eye fasteners makes securing of a bottle to the bottle rest and securing of the arm to the crash bar easy.

DESCRIPTION OF THE PREFERRED EMBODIMENTS

Figure 1:
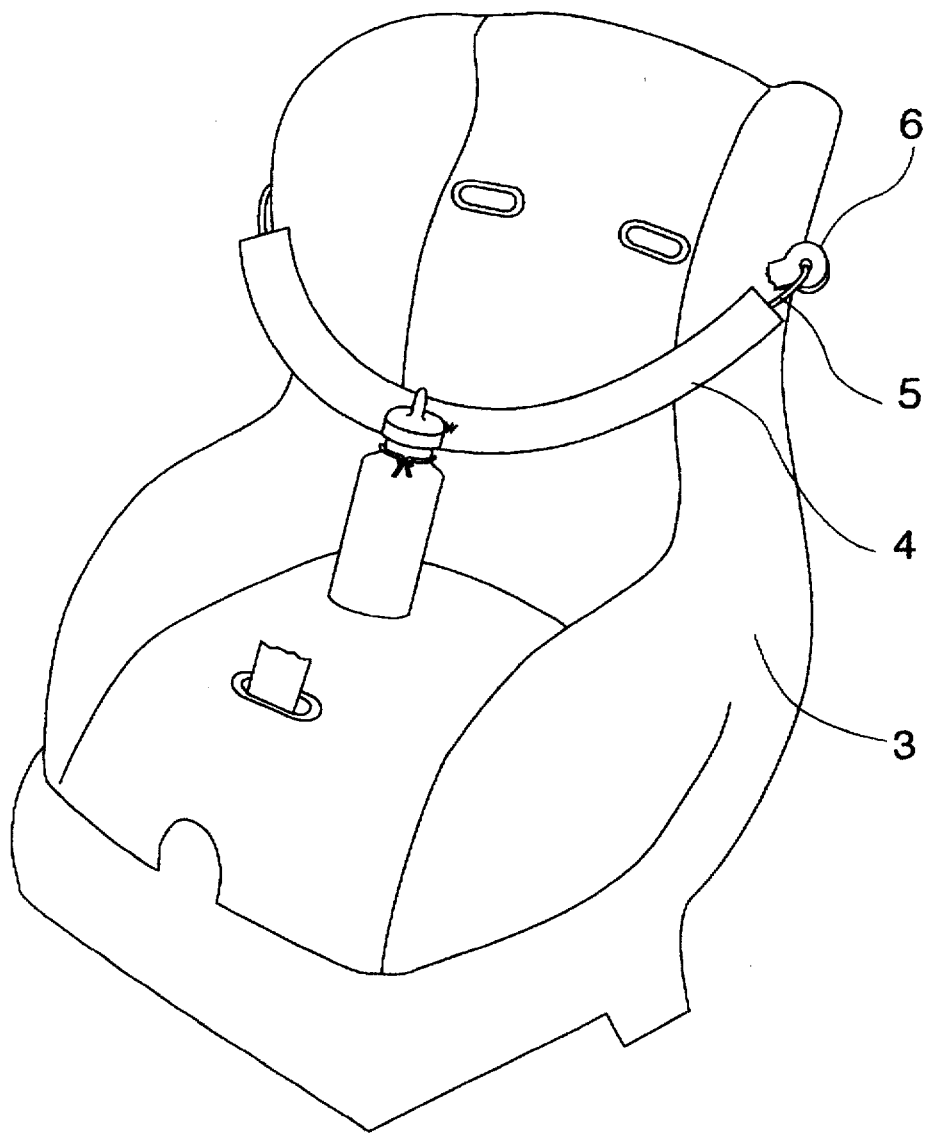
FIG. 1 is an elevational view of a baby car seat not having a crash bar, with the device of the first aspect of the invention in place.
Figure 2:
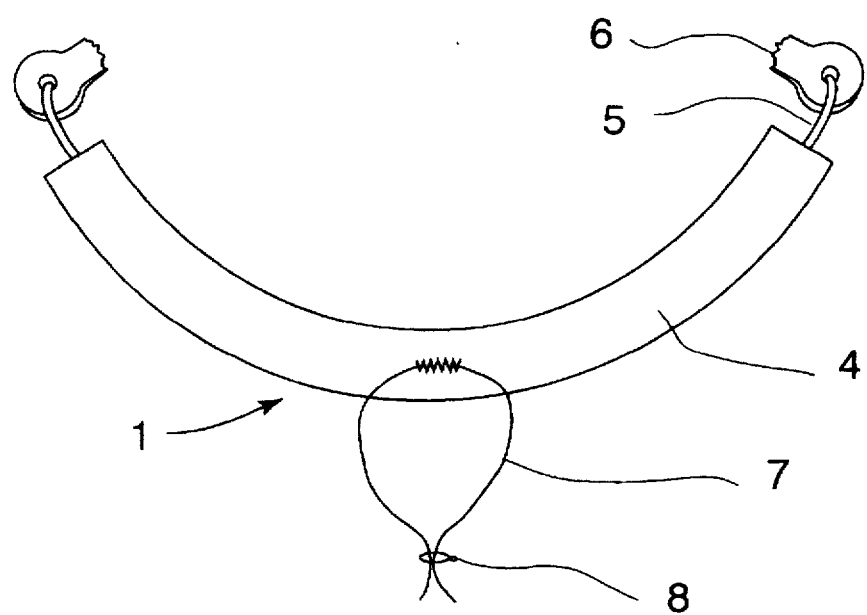
FIG. 2 is an elevational view of the bottle holder of the first aspect of the invention.
Figure 3:
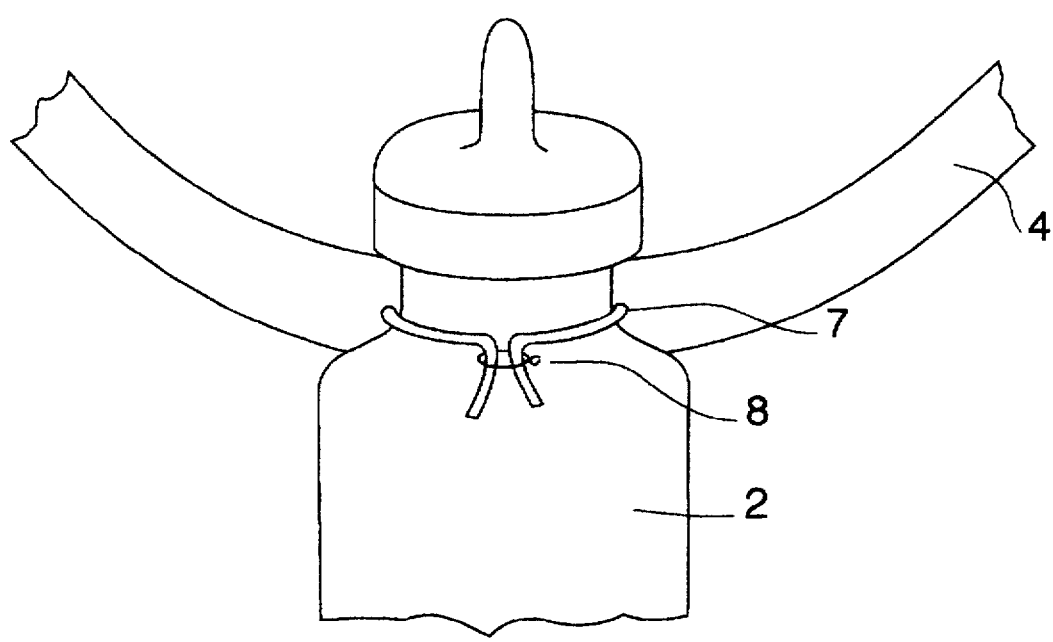
FIG. 3 is an enlarged elevational view showing a bottle held by the device of the first aspect of the invention.
Figure 4:
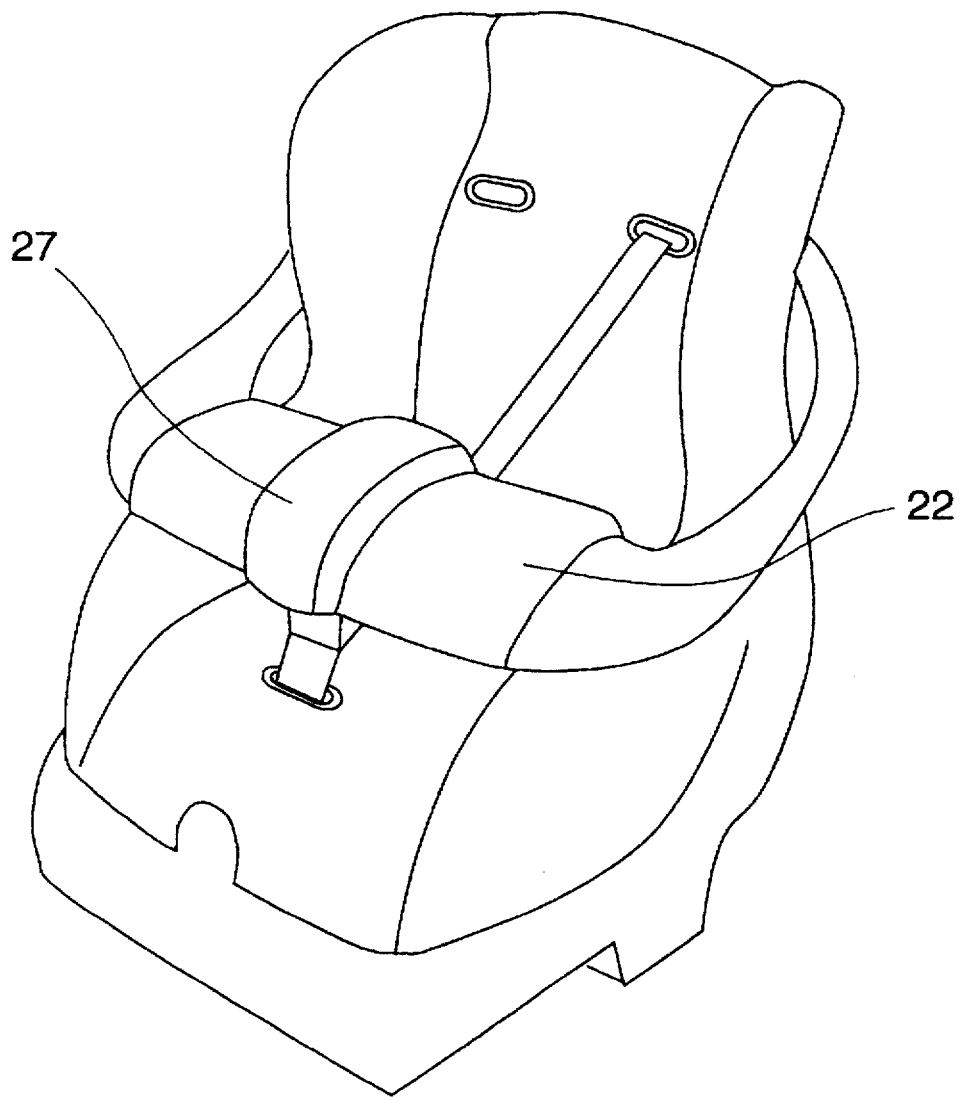
FIG. 4 is an elevational view of a baby car seat having a crash bar, with the arm of the device of the second aspect of the invention in place.
Figure 5:
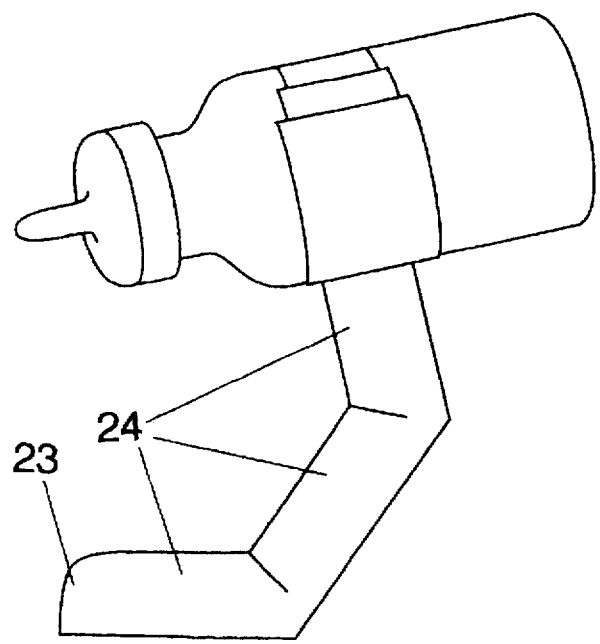
FIG. 5(a) shows the segmented spine of the device of the present invention in the flexed position, and attached bottle holder and bottle.
FIG. 5(b) is similar to FIG. 5(a), showing the segmented spine in the extended position.
Figure 6:
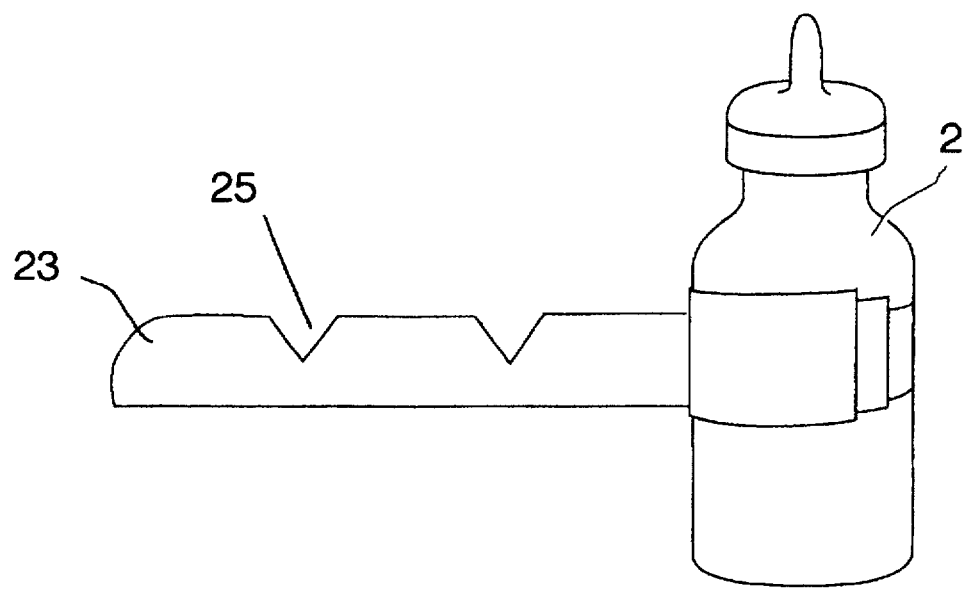
FIG. 6 is an elevational view of the bottle holder of the second aspect of the invention.
Figure 7:
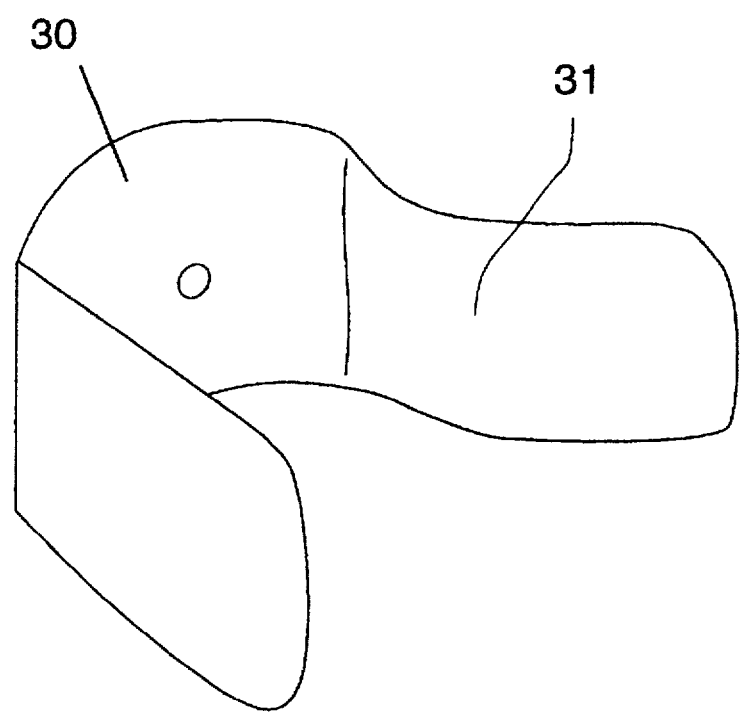
FIG. 7 is a side elevational view of the device of the second aspect of the invention in combination with a baby bottle.
Figure 8:
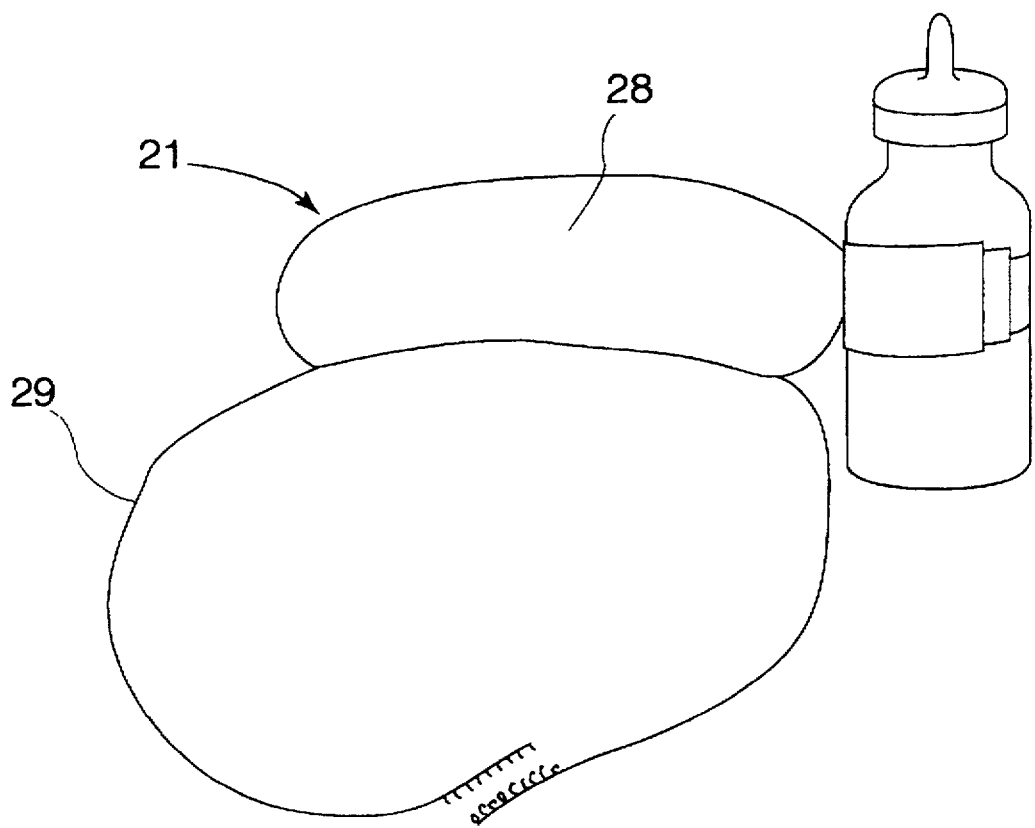
FIG. 8 is a perspective elevational view (partially cut away) of a portion of the sling and adjustable cord.
Figure 9:
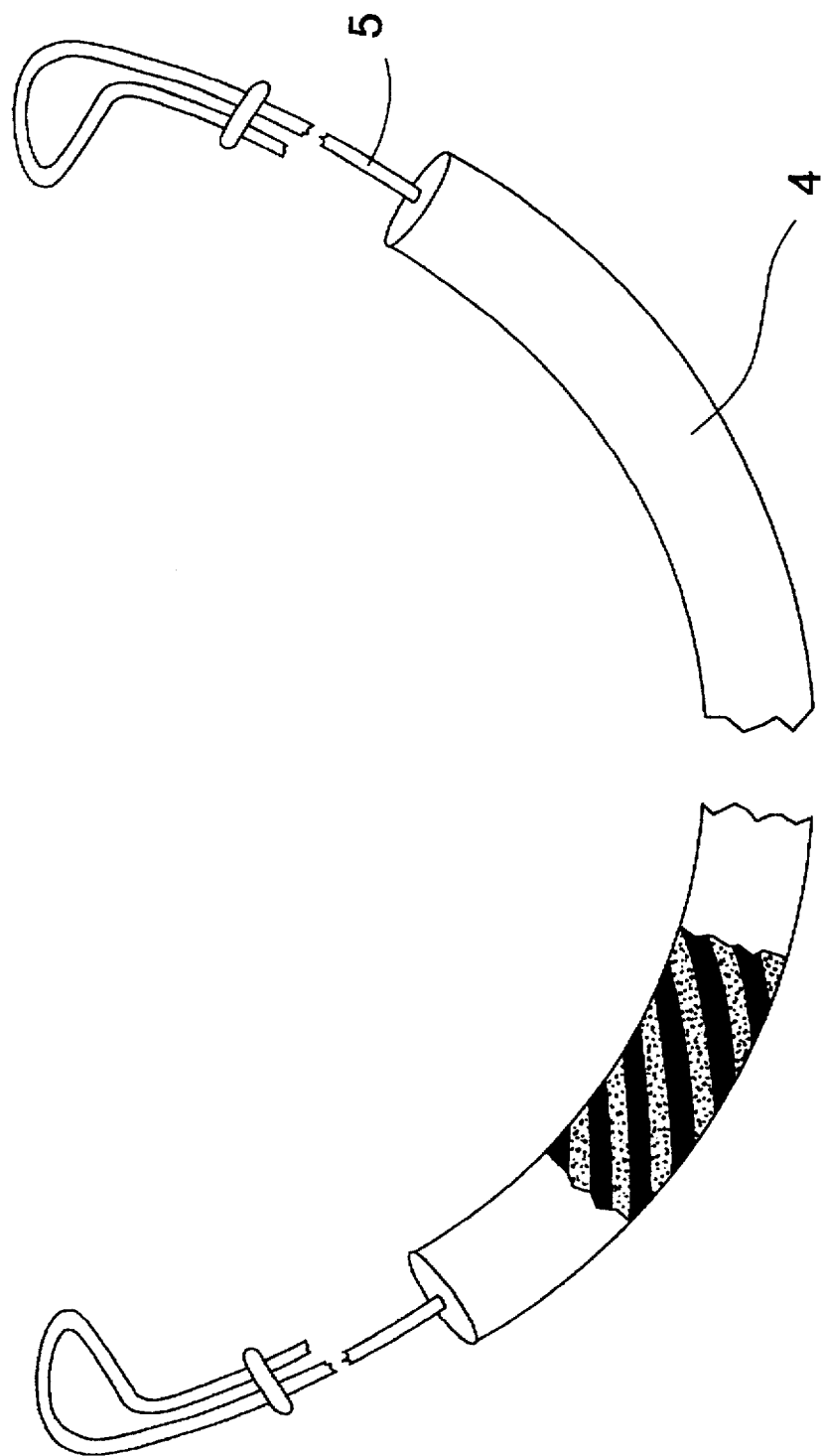

The invention will now be described in detail with reference to the drawings, like numerals referring to like parts throughout.

The first aspect of the present invention is directed to a baby bottle-holding device 1 to be used in securing baby bottles 2 to a car seat 3 which does not have a crash bar. The device 1 contains a longitudinal hollow sling 4 which has two ends and a center. The cover of the sling 4 is preferably made of vinyl cloth or other material which is easily cleaned. The sling 4 is preferably filled with a soft material, such as foamed plastic in order to keep from harming the infant. Attached to each end of the sling 4, is the proximal end of an adjustable cord 5 such as is known in the art. A fastener 6, such as a toothed clip, is attached to the distal end of the adjustable cord 5. By this means, the sling 4 can easily be attached to the baby car seat 5 or to the seat of the automobile. Conventional adjusting means, indicated by box 9, may be utilized.

A holding cord 7 having a center and two ends is attached at the center thereof to the sling 4 at or near the center of the sling 4, preferably by sewing. The holding cord 7 fits around the neck of the baby bottle 2, is drawn snugly to secure the baby bottle 2, and is held securely in place by a readily available cord lock 8. It can be seen that by the use of this device 1, the bottle 2 can be easily attached and detached. It offers no hard surfaces which might accidentally harm the baby, it maintains the bottle 2 in an upright position when the bottle 2 is not in use, and the bottle 2 is positioned so as to be convenient to the baby.

The second aspect of the present invention relates to a device 21 for securing a baby bottle 2 to a baby car seat 3 which contains a crash bar 22. In this device, a longitudinal spine 23 having a plurality of segments 24 of substantially equal length separated by a plurality of V-shaped notches 25 is covered with a foamed plastic (not shown) and a removable cover 27 to form an arm 28. The spine 23 is preferably made of a firm plastic. The foamed plastic filler is soft in order to prevent injury to the child. The cover 27 is made of washable material. The cover 27 may be a sack-like configuration held shut by snaps or a zipper, or it may attach to the foamed plastic by the use of hook-and-eye patches. The arm 28 is secured to the crash bar 22, preferably by straps containing hook-and-eye fasteners.

A bottle rest 30 made of pliable plastic material is attached to the distal end of the arm 28, preferably by a screw into the spine 23. There is a flexible securing strap 31 on either side of the bottle rest 30 for extending around the bottle 2 and holding the bottle 2 snugly to the arm 28. The straps 31 are fastened by hook-and-eye fasteners, buckles, snaps, or any other well-known means.

When the baby raises the bottle 2, the motion of the arm 28 is limited by the abutment of the plurality of segments 24, thus preventing the bottle 2 from striking the baby in the face. Also, when the bottle 2 is raised to the feeding position, the foamed plastic is compressed. When the bottle 2 is released, the foamed plastic is expanded to its original size, forcing the arm 28 to assume its extended position, thus lowering the bottle 2.

As can been readily seen, the device 21 of this aspect of the invention presents no hard surfaces which might injure the child, it maintains the bottle 2 in an upright position to avoid the spilling of liquid, and it allows for easy access to the bottle 2 by the child.

I claim:

1. A device for holding a baby bottle having a neck, which device is for use with a baby car seat which does not have a crash bar, comprising:

(a) an elongated sling having a center and two ends;

(b) first and second connecting cords, each cord having first and second ends and an adjustable length, the first end of the first cord being attached to one end of the sling and the first end of the second cord being attached to the opposite end of the sling;

(c) two fasteners, the first fastener holding the second end of the first cord and the second fastener holding the second end of the second cord, each fastener being capable of attaching to a car seat or a seat of an automobile;

(d) a holding cord having a center and two ends, which cord is attached at or near its center to the sling at or near the center of the sling, and which cord is adapted to encircle the neck of the baby bottle; and (e) a cord lock which is adapted to encompass the two ends of the holding cord, to fit between the two ends of the holding cord and the bottle, and to be tightened so as to hold the baby bottle securely to the sling.

2. The device of claim 1, wherein the sling is filled with foamed plastic.

3. The device of claim 1, wherein the holding cord is attached to the sling by sewing.

4. The device of claim 1, wherein the fasteners are spring clips.

* * * * *